United States Patent
Watanabe et al.

(10) Patent No.: US 7,532,749 B2
(45) Date of Patent: May 12, 2009

(54) LIGHT PROCESSING APPARATUS

(75) Inventors: Mamoru Watanabe, Kawanishi (JP); Masashi Ishiguro, Sanda (JP); Tomoko Fukunaka, Otsu (JP); Kazuhiko Yamashita, Takarazuka (JP); Masahiro Sato, Nishinomiya (JP); Manabu Nishihara, Mino (JP); Kenji Takahashi, Suita (JP); Shinsuke Shimabayashi, Mino (JP)

(73) Assignee: Panasonic Corporation, Osaka (JP)

( * ) Notice: Subject to any disclaimer, the term of this patent is extended or adjusted under 35 U.S.C. 154(b) by 803 days.

(21) Appl. No.: 10/986,893

(22) Filed: Nov. 15, 2004

(65) Prior Publication Data
US 2005/0103753 A1 May 19, 2005

(30) Foreign Application Priority Data
Nov. 18, 2003 (JP) ............................. 2003-387904
Jan. 20, 2004 (JP) ............................. 2004-011372

(51) Int. Cl.
*G06K 9/00* (2006.01)
(52) U.S. Cl. ..................... 382/145; 219/405; 382/144
(58) Field of Classification Search ............... 219/405, 219/410; 382/144, 145, 147, 149
See application file for complete search history.

(56) References Cited

U.S. PATENT DOCUMENTS

| | | | | |
|---|---|---|---|---|
| 5,228,109 A | * | 7/1993 | Fujii et al. ................... 392/419 |
| 5,493,594 A | * | 2/1996 | Hamada et al. ............... 378/34 |
| 5,500,886 A | * | 3/1996 | Duff ............................ 378/207 |
| 5,746,967 A | * | 5/1998 | Hoy et al. .................... 264/406 |
| 5,825,476 A | * | 10/1998 | Abitol et al. ................ 356/124 |
| 6,055,055 A | * | 4/2000 | Toh ............................. 356/609 |
| 6,362,822 B1 | * | 3/2002 | Randel ........................ 345/426 |
| 6,407,373 B1 | * | 6/2002 | Dotan ........................ 250/201.3 |

(Continued)

FOREIGN PATENT DOCUMENTS

JP 3-238185 10/1991

(Continued)

*Primary Examiner*—Gregory M Desire
(74) *Attorney, Agent, or Firm*—McDermott Will & Emery LLP

(57) ABSTRACT

Provided is a light processing apparatus which can judge goodness or badness of small amount and various kind processing, and is useful for small amount and various kind processing, and can realize light processing at an appropriate position in conformity with a state of a substrate, at low cost, and can prevent production of a bad item before it happens, and enables local heating by focusing light energy, and is useful for a processing apparatus such as solder joint or heat processing of resin and a production equipment which used this. A state of an object to be processed enters into an image receiving unit, through a first light path and a second light path. This image and an image which was set up in a storage device in advance are compared, and goodness or badness judgment is carried out. There occurs a change of a point to be irradiated, in an approximately horizontal direction to the first light path, between a case that the object to be processed is in a warp age state, and a case that it is not so. The change is read as a change of an image shooting position of reflected light by the image receiving unit. It is possible to realize error stop of processing, by a level of a change amount, and to prevent processing bad item production before it happens.

25 Claims, 10 Drawing Sheets

U.S. PATENT DOCUMENTS

| | | | |
|---|---|---|---|
| 6,496,253 B1* | 12/2002 | Vokhmin | 356/124 |
| 6,750,974 B2* | 6/2004 | Svetkoff et al. | 356/602 |
| 6,861,660 B2* | 3/2005 | Almogy et al. | 250/559.45 |
| 6,907,151 B2* | 6/2005 | Yunus | 385/14 |
| 6,965,120 B1* | 11/2005 | Beyerer et al. | 250/559.45 |
| 7,039,228 B1* | 5/2006 | Pattikonda et al. | 382/145 |
| 7,099,002 B2* | 8/2006 | Ishiura et al. | 356/237.2 |
| 7,142,708 B2* | 11/2006 | Sakai et al. | 382/149 |
| 7,158,099 B1* | 1/2007 | Berube et al. | 345/9 |
| 7,199,882 B2* | 4/2007 | Svetkoff et al. | 356/602 |
| 7,215,491 B2* | 5/2007 | Ueno et al. | 359/739 |
| 2002/0020696 A1* | 2/2002 | Kitamura et al. | 219/390 |
| 2002/0030898 A1* | 3/2002 | Kouchiyama et al. | 359/738 |
| 2002/0031249 A1* | 3/2002 | Komuro et al. | 382/149 |
| 2002/0051637 A1* | 5/2002 | Ichimiya | 396/104 |
| 2002/0186878 A1* | 12/2002 | Hoon et al. | 382/149 |
| 2003/0073007 A1* | 4/2003 | Lahrichi | 430/1 |
| 2003/0147060 A1* | 8/2003 | Tokuda et al. | 355/53 |
| 2004/0075843 A1* | 4/2004 | Marron et al. | 356/511 |
| 2004/0101109 A1* | 5/2004 | Shih et al. | 378/207 |
| 2004/0109231 A1* | 6/2004 | Haisch et al. | 359/385 |
| 2005/0057533 A1* | 3/2005 | Liu | 345/179 |
| 2005/0199645 A1* | 9/2005 | Sivertsen et al. | 221/221 |
| 2005/0259245 A1* | 11/2005 | Cemic et al. | 356/237.2 |
| 2006/0033987 A1* | 2/2006 | Stelzer et al. | 359/385 |

FOREIGN PATENT DOCUMENTS

| | | |
|---|---|---|
| JP | 7-86799 | 3/1995 |
| JP | 8-159981 | 6/1996 |
| JP | 11-320155 | 11/1999 |

\* cited by examiner

LIGHT PROCESSING APPARATUS

FIELD OF THE INVENTION

This invention relates to a processing apparatus for solder joint or heat processing of resin, which enabled local heating by focusing light energy, and a production equipment which used this.

BACKGROUND OF THE INVENTION

In recent years, on the occasion of processing a resin substrate which underlies a printed board used for circuit implementation etc., boring with laser light is carried out, in addition to drilling with a mechanical drill which was used in the past. The such like technique is disclosed in for example, JP-A-11-320155 publication.

For solder joint, without using a reflow furnace, it has become to use light heating processing typified by laser light etc., which carries out melting by use of an light processing machine and is used for implementation. The such like technique is disclosed in for example, JP-A-3-238185 publication.

Goodness or badness of a processing state by an light processing apparatus typified by laser processing, as described above, is evaluated after processing. There are many cases that goodness or badness judgment for solder joint is carried out by such an X-ray image that X ray passed through a joint part by an X-ray inspection apparatus.

There is also such a method that a color (bad mark), which is used on the occasion of carrying out goodness or badness judgment in a substrate from which many pieces are taken, is applied to an object to be processed before processing starts, and existence of the color is confirmed after processing. There is no case that portion is skipped from processing, by goodness or badness judgment by a color. The such like technique is disclosed in for example, JP-A-8-159981 publication.

In case of carrying out processing such as solder joint, by use of optical energy, a distance between a processing unit and an object to be processed such as a substrate is one of important parameters which affects not only an irradiation diameter but also a feeding position of string solder. However, in many substrate, deformation distortion at the time of manufacturing, and deformation due to reflow, repetition of thermal shock cycle in a reflow process etc. are encouraged. In addition, influence of deflection due to weight of a mounted component itself becomes an unignorable level depending on the number of components, and a kind of a component. To these substrate warp age states, in prior art, there are a method of suppressing them to a non-influential level by thinking out a jig etc., and such a method that a contact type gauge and a non-contact type dedicated sensor are disposed in conformity to a substrate, and by use of them, an amount of warp age is calculated and corrected. The such like technique is disclosed in for example, JP-A-7-86799 publication.

SUMMARY OF THE INVENTION

An light processing apparatus comprises:
a light energy output unit which outputs light energy;
a first light path which guides light energy to an object to be processed;
a second light path in which a part of a light path from an object to be processed overlaps with the first light path;
an image receiving unit which is disposed in the second light path; and
a comparing unit which compares an image from the image receiving unit and an image which has been set up in advance, to carry out goodness or badness judgment.

An light processing apparatus comprises:
a light energy output unit which outputs light energy;
a first light path which guides light energy to an object to be processed;
a second light path in which a part of a light path from an object to be processed overlaps with the first light path;
an image receiving unit which is disposed in the second light path;
an irradiating unit which irradiates light to vicinity of the second light path on an object to be processed from an oblique direction to an object to be processed; and
a detecting unit which receives a signal, which corresponds to a shape of light from the irradiating unit on an object to be processed, and detects a position of an object to be processed to the first light path which is approximately in a horizontal direction against a direction of light energy.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EXEMPLARY EMBODIMENTS

The invention will be hereinafter described together with embodiments 1 through 5.

A method of judging goodness or badness of processing as described above has problems as follows.

For example, in case of using an X-ray inspection apparatus, mainstream is such a method that a sample is selected at random, out of many printed boards after completion of solder joint, and goodness or badness thereof is judged, but in this method, it is not possible to confirm all of goodness or badness thereof. Such an inline system that an X-ray inspection apparatus is incorporated in a production line of printed boards is also in practical use, but it has such a drawback that the number of processes for production becomes large.

In case that a color (bad mark), which is used on the occasion of goodness or badness judgment in a substrate from which many pieces are taken, exists on an object to be processed before processing starts, these are applied with ink etc., and it is not possible to carry out goodness or badness judgment with a simple method.

It is an object of the invention to provide a unit which can carry out goodness or badness judgment of an object to be processed, easily, in order to solve the above-described problems.

According to the invention, it becomes possible to store images and threshold values of a good item and a bad item before and after processing of each processing region, in advance, and compare the image and an image of an object to be processed, before and after processing, to carry out goodness or badness judgment.

In case that a color (bad mark), which is used on the occasion of goodness or badness judgment in a substrate from which many pieces are taken, exists on an object to be processed before processing starts, it is possible to skip that portion from processing, before processing of each processing region. Therefore, it is possible to omit unnecessary processing, and to reduce time and cost.

Embodiment 1

Figure 1:
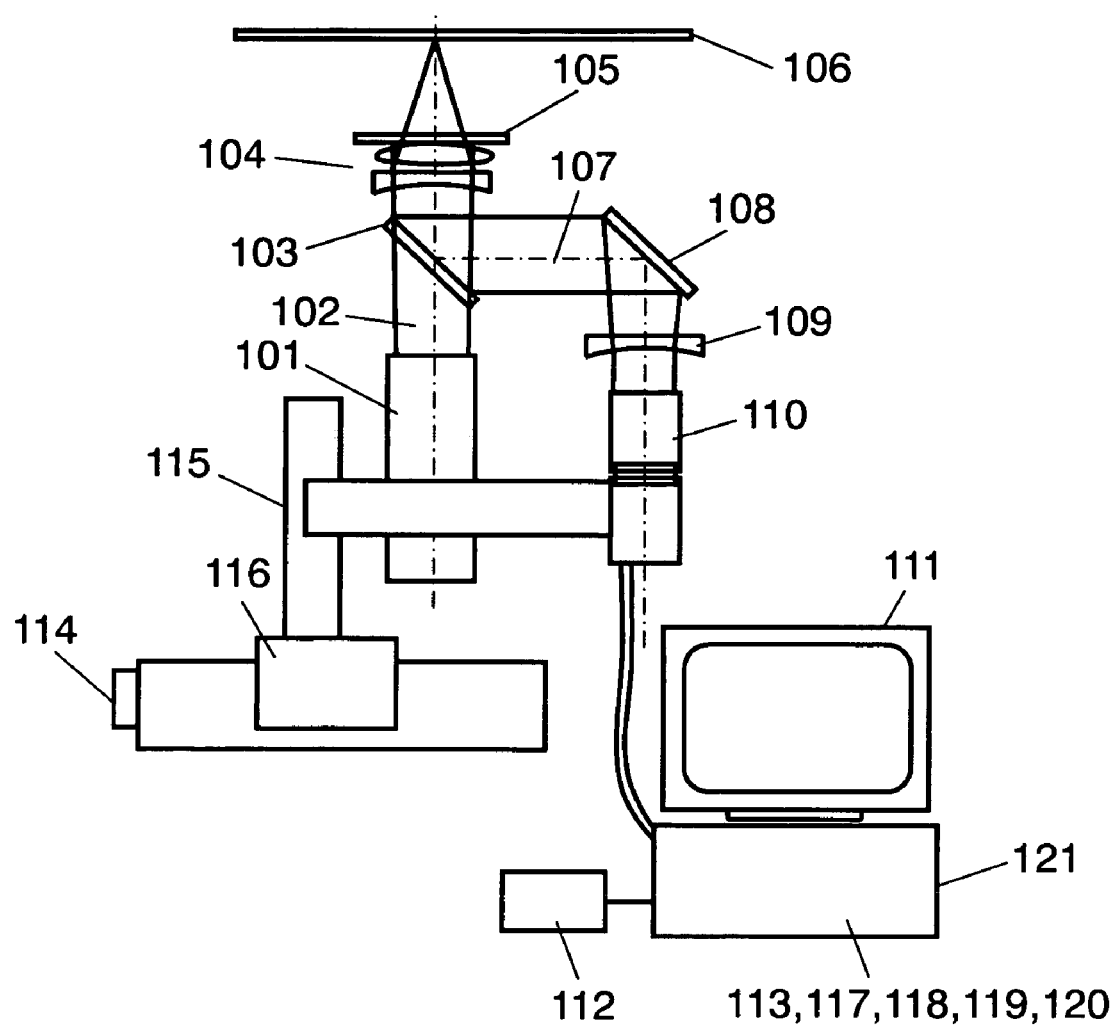
FIG. 1 is a block diagram which shows an embodiment of an light processing apparatus in an embodiment of the invention.
Figure 2:
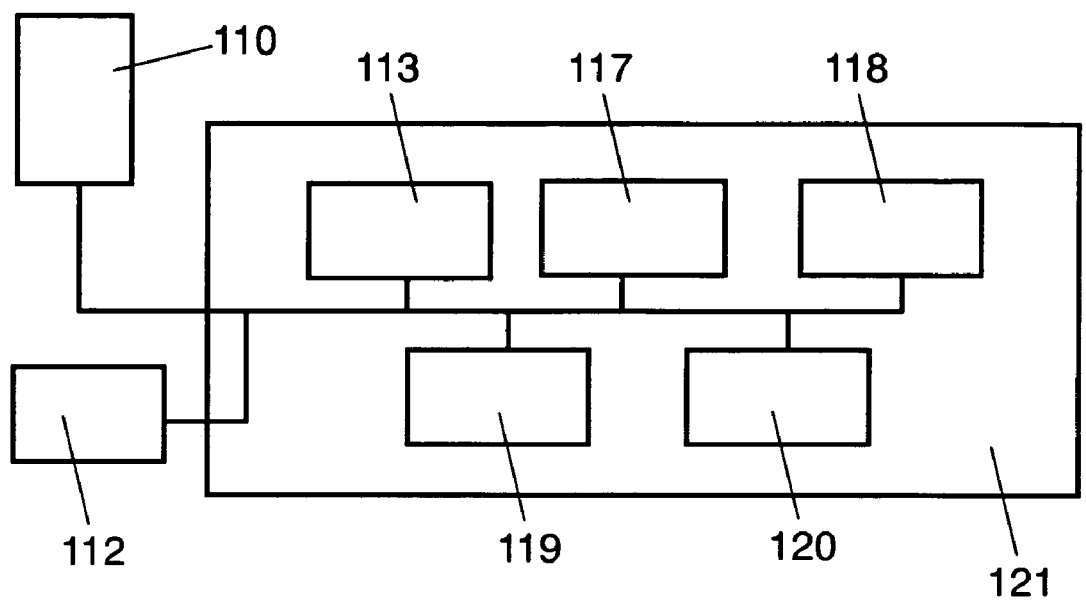
FIG. 2 is a block diagram which shows one embodiment of a control device main body of the light processing apparatus in the embodiment of the invention.

Hereinafter, a best mode for carrying out the invention will be described by use of FIGS. 1 and 2.

In the figures, light energy output unit 101 is a unit which outputs light energy, and in case of resin processing, a laser oscillator is mainly used. As this laser oscillator, various laser oscillators such as a carbon dioxide gas laser oscillator, an oscillator of YAG laser, and an oscillator of a semiconductor laser are usable. In case of solder joint, a Xenon lamp etc. are used. (First) light path 102 of light energy is a light path which guides laser light and lamp light, which are light energy, to an object to be processed, and in general, a fiber is used for light guiding. Half mirror 103 has a characteristic of transmitting a wavelength component of light energy necessary for processing and joint, and reflecting a visible light component.

Optical unit 104 is a unit which shapes light energy, and is configured by various lenses such as a spherical lens and a cylindrical lens. Optical unit 104 shapes and focuses light which comes out from light energy output unit 101 to a necessary beam diameter. Its focusing characteristic is set up in conformity with a diffusion characteristic of a light energy light source.

Protection glass 105 is detachable, and prevents a foreign matter including dust, which is bounced back from a substrate etc. at the time of processing, from being attached to optical unit 104. In case that a light energy output was lowered due to foreign matter attachment, a light output is restored by replacing this, to make maintenance easy.

Object 106 to be processed is a target for processing of this apparatus, and it is mainly an epoxy resin substrate which is used for a printed board in case of boring by laser, and it is mainly a printed board in case of solder joint.

(Second) light path 107 of the image receiving unit is a light path for guiding light reflected by a half mirror, among reflected waves from an object to be processed, to the image receiving unit which will be described later, and a fiber is used for light guiding. Light, which was reflected by half mirror 103 and passed through light path 7, is reflected again by half mirror 108, and reaches to image receiving unit 110, passing through lens 109 as an image distortion correcting unit which corrects an image distorted by the shaping unit of light energy.

Image receiving unit 110 has an image receiving element typified by CCD and CMOS, and converts received light into an electric signal, and sends a video signal to display unit 111 which is realized by CRT and a liquid crystal screen, over applying image correction etc. On display unit 111, displayed is an image signal of an object to be processed, which passed from image receiving unit 110. A thing which is shown by reference numerals 101 through 110 will be hereinafter called as a processing head.

Image comparing unit 112 is connected to control device main body 121, and compares good item images before and after processing, which were stored in storing unit 113 disposed in this control device main body 121, with an image of an object to be processed, which was taken by image receiving unit 110.

As to the light processing apparatus in this embodiment, its operation will be hereinafter described.

Firstly, laser light or lamp light, which came out from light energy output unit 101, passes through half mirror 103 along first light path 102, and enters into light energy shaping unit 104. Here, it is focused to a necessary size, and it is irradiated on object 106 to be processed, through protection glass 105. By this focused light, object 106 to be processes is processed in a manner of boring and cutting of an object to be processed in case of laser light, and solder joint in case of lamp light. Light reflected by object 106 to be processed is reflected by half mirror 103 to second light path 107, through protection glass 105 and light energy shaping unit 104. After it was reflected again by half mirror 108, it enters into image receiving unit 110, through image distortion correcting unit 109. This information is sent to image display unit 111, and displayed as an image.

In case of carrying out goodness or badness judgment of an object to be processed, it becomes possible by depressing a switch which is not shown in the figure to select an image of a good item after processing, which has been recorded in storing unit 113 in advance, and to display them by the display unit at the same time, and to compare by eyes of a viewer. Further, a configuration for comparing both sides may be also possible, by use of image comparing unit 112 which is connected to control device main body 121. The image comparing unit can convert it into luminance information of each pixel of an image which was stored in storing unit 113 in advance, and compare this luminance information with luminance information of each pixel of an image of an object to be processed with respect to each pixel, to carry out goodness or badness judgment. It is also possible to make a comparison by overlapping a good item image and an image of an object to be processed, through the use of a super impose method.

As described above, according to this embodiment, it is possible to carry out goodness or badness judgment of an object to be processed.

Embodiment 2

In this embodiment, as to the same portions as in embodiment 1, identical reference numerals are given to omit detailed descriptions. It will be described by use of FIG. 1.

Recognizing unit 114 elicits a processing position, and detects a position of the processing head. First driving unit 115 relatively moves the first light path and an object to be processed, in an approximately vertical direction to a direction of light energy. Second driving unit 116 relatively moves the first light path and an object to be processed, in an approximately horizontal direction to a direction of light energy. Drive controlling unit 117 controls the first driving unit and second driving unit. Meanwhile, drive controlling unit 117 is built into control device main body 121.

As to the light processing apparatus in this embodiment, its operation will be hereinafter described.

Detecting a position of the processing head from information of processing head position recognizing unit 114, drive controlling unit 117 can change a relative position of an object to be processed and the processing head, by first driving unit 115 and second driving unit 116.

As described above, according to this embodiment, it is possible to take in an image of an object to be processed, regardless of a position of a processing region of an object to be processed.

Embodiment 3

Figure 3:
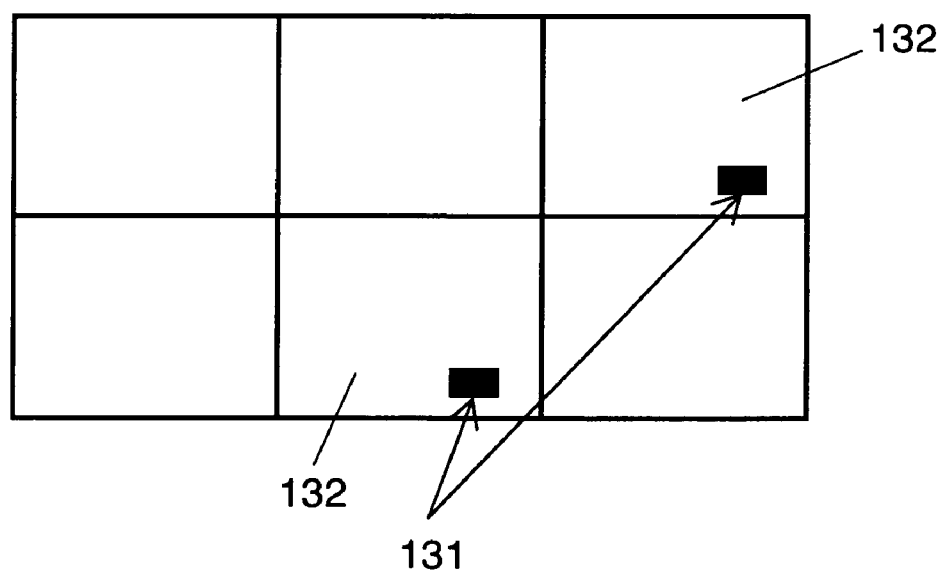
FIG. 3 is an explanatory view of a bad mark on an object to be processed in the embodiment of the invention.

In this embodiment, as to the same portions as in embodiment 2, identical reference numerals are given to omit detailed descriptions. It will be described by use of FIGS. 1, 2 and 3. Color comparing unit 118 is built into control device main body 121, and plays a role of judging whether a color (bad mark), which is used on the occasion of carrying out goodness or badness judgment, exists on an object to be processed, before processing starts. Color (bad mark) 131 shown in FIG. 2 is used on the occasion of carrying out goodness or badness judgment. This bad mark 131 is a color as an eye mark which is attached to a bad portion before processing starts.

As to the light processing apparatus in this embodiment, its operation will be hereinafter described. Image information, which was taken in from image receiving unit 110, is transmitted to control device main body 121, and inputted into color comparing unit 118. A color threshold value of the bad mark has been set up in storing unit 113 in advance. When image information is inputted into color comparing unit 118, color threshold value information is pulled out from storing unit 113 by a color threshold value pull-out instruction from this color comparing unit 118, and inputted into color comparing unit 118. Color comparing unit 118 compares a color which is included in image information and color threshold value information. As a result of comparison, in case that color comparing unit 118 judged that there is the bad mark, coordinate information of such a position that there is the bad mark is obtained from image information by CPU, and that portion is skipped from processing.

As described above, according to this embodiment, in case that a portion of an object to be processed is known as a bad portion before processing starts, it is possible not to carry out useless processing, by skipping it from processing.

Embodiment 4

In this embodiment, as to the same portions as in embodiment 3, identical reference numerals are given to omit detailed descriptions. It will be described by use of FIGS. 1 and 2. In this embodiment, a role of a pre-irradiation comparing unit, which is build in control device main body 121 and shown by reference numeral 19, and makes a comparison before an object to be processed is irradiated with light energy, will be described.

Image information, which was taken in from image receiving unit 110, is inputted to pre-irradiation comparing unit 119. In storing unit 113, image information of good items and bad items before laser light or lamp light irradiates has been stored in advance. When image information from image receiving unit 110 is inputted to pre-irradiation comparing unit 119, images of good items and bad items before irradiation, which are stored in storing unit 113, are pulled out by a pull-out instruction from this pre-irradiation comparing unit 119, and inputted to pre-irradiation comparing unit 119.

Pre-irradiation comparing unit 119 compares image information which was inputted from image receiving unit 110, and image information which was inputted from storing unit 113, and judges a good item portion and a bad item portion of a processing target. As a result, as to the same image portion as an image of a bad item portion which was stored in storing unit 113, coordinate information of its position is obtained, to carry out such processing that that place is not processed.

As described above, according to this embodiment, in case that a portion of an object to be processed is known as a bad portion before processing starts, it is possible not to carry out useless processing, by skipping it from processing.

Embodiment 5

In this embodiment, as to the same portions as in embodiment 4, identical reference numerals are given to omit detailed descriptions. It will be described by use of FIGS. 1 and 2. In this embodiment, a role of the post-irradiation comparing unit, which is build in control device main body 121 and shown by reference numeral 120, and makes a comparison after an object to be processed is irradiated with light energy, will be described.

Image information, which was taken in from image receiving unit 110, is inputted to pre-irradiation comparing unit 119. In storing unit 113, image information of good items and bad items before laser light or lamp light is irradiated has been stored in advance. When image information from image receiving unit 110 is inputted to post-irradiation comparing unit 120, images of good items and bad items before irradiation, which are stored in storing unit 113, are pulled out by a pull-out instruction from this post-irradiation comparing unit 120, and inputted to post-irradiation comparing unit 120.

Post-irradiation comparing unit 120 compares image information which was inputted from image receiving unit 110, and image information which was inputted from storing unit 113, and judges a good item portion and a bad item portion after processing.

As described above, according to this embodiment, it is possible to carry out goodness or badness judgment of an object to be processed. Therefore, the light processing apparatus of the invention can judge goodness or badness of small amount and various kind processing, and is useful for a technical field of processing small amount and various kind products.

Next, the invention will be described together with embodiments 6 through 15.

In a response by use of a jig among the above-described conventional techniques, there is a necessity to prepare a dedicated jig with respect to each substrate. In case of using a contact type gauge and a non-contact type dedicated sensor, there is a necessity to prepare a plurality of gauges and dedicated sensors in conformity with a substrate size, and in addition, its allocation is fixed in conformity with a substrate, and there is a necessity to replace or re-allocate an allocation with respect to each substrate.

The invention can detect a warp age state, or amount of warp age, of an object to be processed, by irradiating irradiation light with an object to be processed from an oblique direction, and inputting its reflected light to the image receiving unit, and detecting its image shooting position, without use of a dedicated sensor, and therefore, can realize light processing at an appropriate position in conformity with a state of a substrate at low cost, and prevent production of a bad item, before it happens.

Embodiment 6

Figure 4:
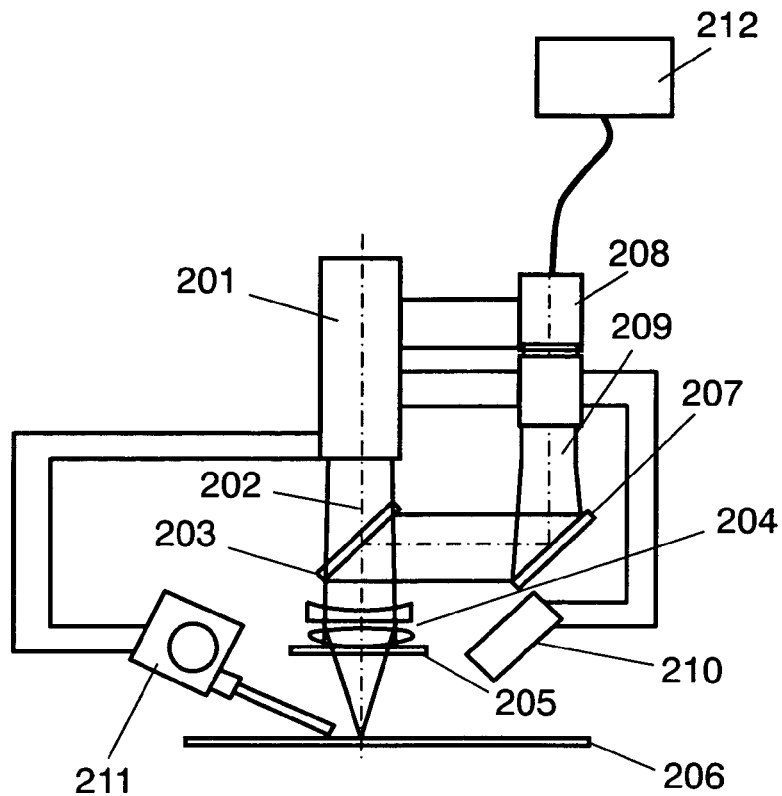
FIG. 4 is a schematic view of an apparatus configuration in a sixth embodiment of the invention.

Embodiment 6 of the invention will be described by use of FIGS. 4 and 5. Light energy output unit 201 is a processing energy source which outputs light energy. First light path 202 shows a light path of light energy for guiding light energy to an object to be processed. Half mirror 203 has a characteristic for transmitting a wavelength component of light energy and for reflecting a visible light component.

Optical unit 204 is a unit which shapes light energy, and is configured by for example, combination of a face lens and a cylindrical lens etc., and focuses light which comes out from the energy output unit to a necessary beam diameter. Its focusing characteristic is set up in conformity with a diffusion characteristic of the light energy light source. Protection glass 205 is a detachable protection glass, and prevents a foreign matter which occurs at the time of processing, from being attached to optical unit 204. In case that a light energy output was lowered due to foreign matter attachment, a light output is restored by replacing this, to make maintenance easy.

Object 206 to be processed is a target for processing of this apparatus. Mirror 207 guides light of an object to be processed to image receiving unit 208. Image receiving unit 208 is a unit for viewing an image of an object to be processed. Light path (second light path) 209 shows a light path of image receiving unit 208. Irradiating unit 210 irradiates light to vicinity of the second light path on an object to be processed from an oblique direction to the object to be processed. Reference numeral 211 shows a string solder feeding device. Measuring unit 212 receives reflected light of light which came out from irradiating unit 210, from image receiving unit 208, and reads out its state change, and calculates an amount of warp age of an object to be processed.

Figure 5:
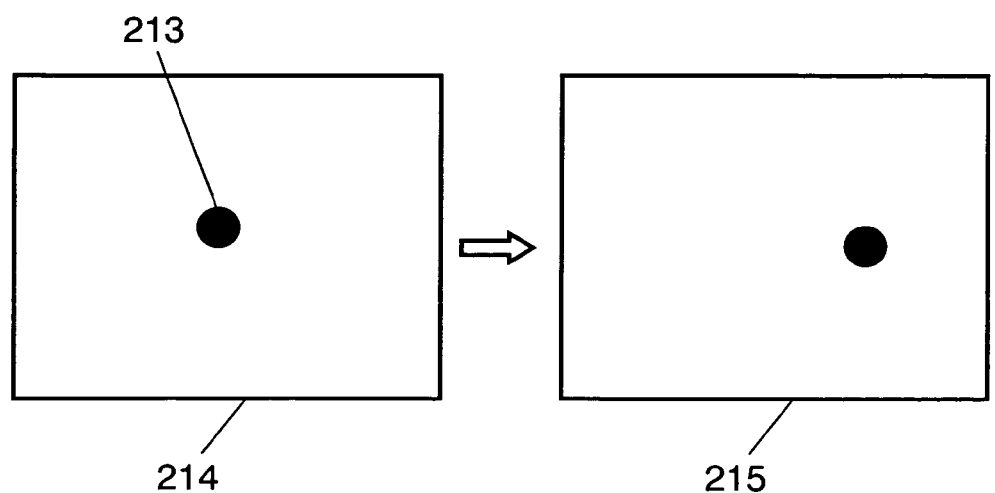
FIG. 5 is a screen view of an irradiation state in the sixth embodiment of the invention.

FIG. 5 is a view which showed a change of an image receiving state of the reflected light, and reference numeral 213 shows a shape of irradiated reflected light. Reference numeral 214 shows an irradiated state screen in case that there is no warp age, and reference numeral 215 shows an irradiated state screen when warp age occurred. As to the light processing apparatus which was configured as described above, its operation will be described.

Firstly, light, which comes out from the light energy output unit 201, is transmitted through half mirror 203 along first light path 202, and enters into light energy shaping unit 204, and is focused here to a necessary size, and irradiates object 206 to be processed, through protection glass 205.

Object 206 to be processed is processed by this focused light. Light, which came out from object 206 to be processed, is reflected by half mirror 203 to second light path 209, through protection glass 205 and light energy shaping unit 204. After it is reflected again by mirror 207, it enters into image receiving unit 208. Since string solder feeding unit 211 is disposed, it is possible to irradiate light beam to a predetermined region of an object to be processed by the processing head, and to feed solder in a heated irradiation region, and to carry out soldering processing.

Figure 7:
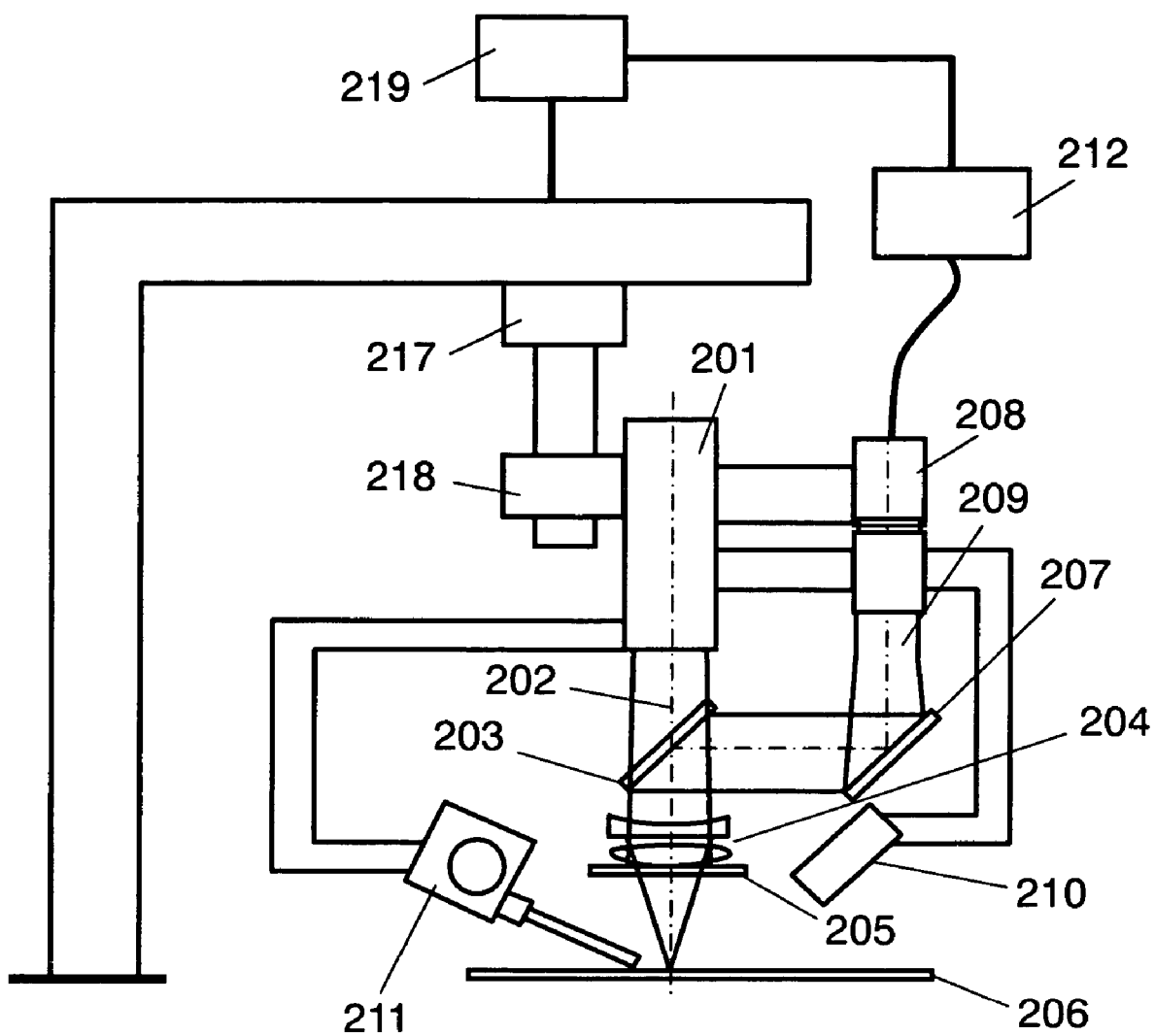
FIG. 7 is a schematic view of an apparatus configuration in an eighth embodiment of the invention.

In soldering processing, in case that a substrate is considered as one example of object 206 to be processed, when there occurs warp age on the substrate, a point to be irradiated is shifted in approximately horizontal direction as compared with first light path 202, by this warp age sate. With that, there occurs a change of an irradiation diameter at the time of light beam processing, and it is also shifted from a string solder feeding position. At this time, it is possible to observe reflected light in case that light irradiated the vicinity of the second light path on an object to be processed from an oblique direction to the object to be processed, by image receiving unit 208 as shown in FIG. 7.

Even if it is an identical point, an image shooting position of the reflected light is changed in a manner of reference numerals 213 and 214 of FIG. 5, between a case that there is no warp age on a substrate and a case that there is warp age on the substrate. By this means, it is possible to detect that warp age of the substrate occurs, through the use of irradiating unit 210 and image receiving unit 208.

A change amount of an image shooting position of this reflected light represents a level of a warp age state of the substrate, and it is possible to realize error stop depending on a level of the change amount, and it is possible to prevent processing bad item production before it happens. It also becomes possible to detect an absolute value of a substrate warp age amount, by investigating correlation of a predetermined substrate warp age amount and a change amount of an image shooting position of reflected light on the image receiving unit in advance.

Meanwhile, as a concrete example of light energy, there is a laser and a lamp, and as the image receiving unit, there is a camera, and as the image correcting unit, there is a lens.

Embodiment 7

Figure 6:
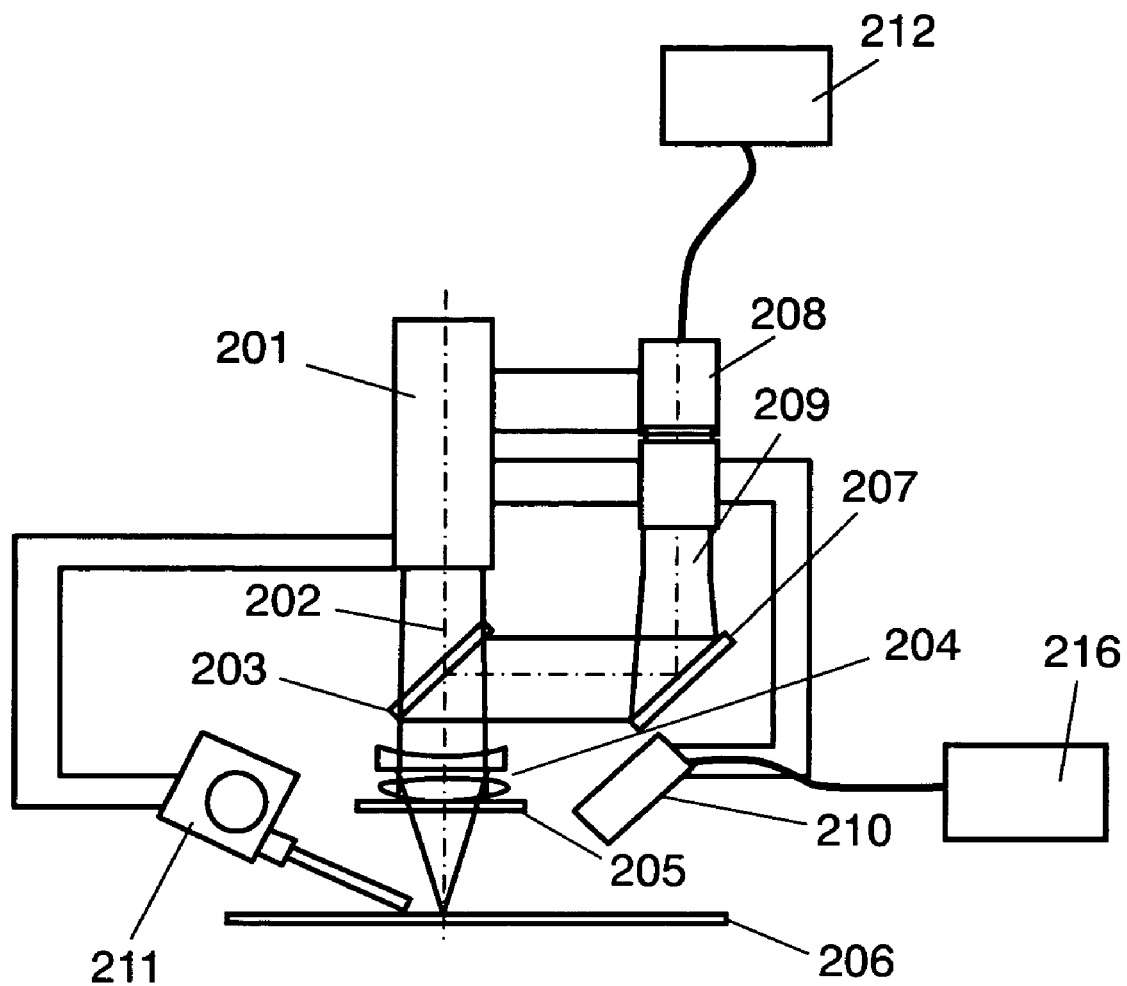
FIG. 6 is a schematic view of an apparatus configuration in a seventh embodiment of the invention.

A seventh embodiment of the invention will be described by use of FIG. 6. Reference numerals 201 through 212 are the same as in the configuration of FIG. 4, but disposed is light amount controlling unit 216 which can change a light amount of the irradiating unit.

In the light processing apparatus by this configuration, even in case that a state of reflected light of irradiation light by irradiating unit 210 becomes weak depending on a surface state of an object to be processed, or even in case that it is excessive, it is possible to make an amount of light, which is emitted from irradiating unit 210, in an optimum irradiation state by light amount controlling unit 216, and it is possible to stably carry out warp age state detection of a substrate. It is also possible to realize control of the light amount, by changing an amount of electric power which is given to a lamp etc., and also by disposing a plurality of lamps and changing the number of lamps for giving electric power, stepwise.

Embodiment 8

An eighth embodiment of the invention will be described by use of FIG. 7. Reference numerals 201 through 212 are the same as in the configuration of FIG. 4, but disposed are first driving unit 217 which relatively moves a first light path and an object to be processed, in an approximately vertical against a direction of light energy, second driving unit 218 which relatively moves the first optical path and the object to be processed in an approximately horizontal direction against the direction of light energy, and drive controlling unit 219 which controls the first driving unit and the second driving unit.

In the light processing apparatus by this configuration, it is possible to carry out positioning movement at an arbitrary point on a substrate by controlling a moving direction and a moving amount of first driving unit 217 through the use of drive controlling unit 219, and it is possible to measure substrate warp age at an arbitrary point. Second driving unit 218 is controlled by drive controlling unit 219 on the basis of a substrate warp age amount which was measured by the measuring unit, to move the processing head in a direction of the substrate warp age, and thereby, it is possible to carry out high quality soldering processing without bringing about a change of an irradiation diameter and deviation of a string solder feeding position at the time of light beam processing. It is applicable by use of a so-called X-Y table which is used in a processing apparatus and its control device. Meanwhile, in drive controlling unit 219, a control program for controlling moving directions and moving amounts of first driving unit 217 and second driving unit 218 has been incorporated in advance. It is possible to irradiate light energy to a desired position, by inputting X-Y coordinate data of deviance of an irradiation position, which occurred due to warp age of a substrate, as coordinate information of a place to be moved. With regard to control of a program retarding drive control and a moving direction and a moving amount of the driving unit, it is possible to be carried out by the same way of thinking, even in the following embodiments in which a mode of the driving unit is different.

Embodiment 9

Figure 8:
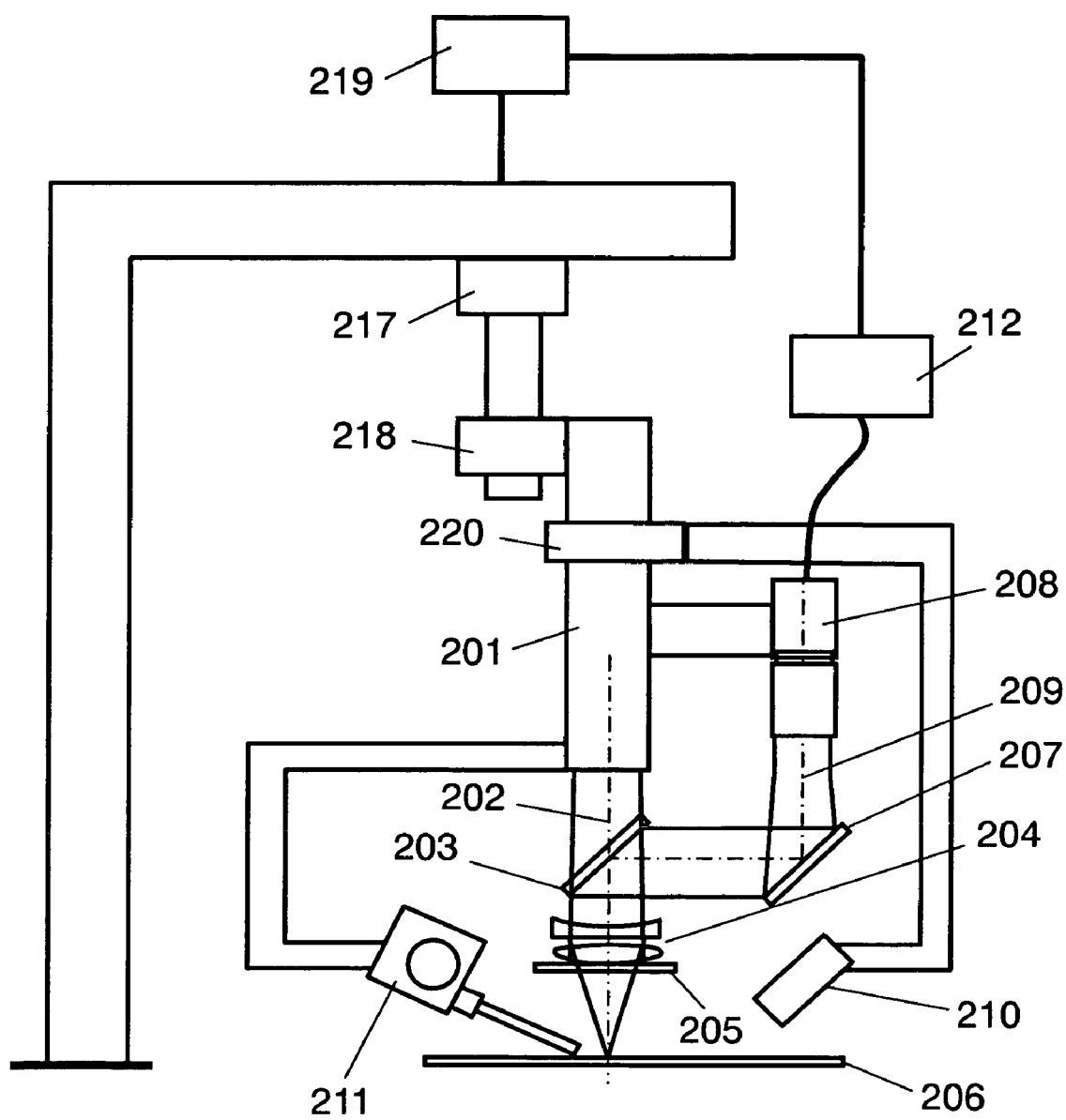
FIG. 8 is a schematic view of an apparatus configuration in a ninth embodiment of the invention.

A ninth embodiment of the invention will be described by use of FIG. 8. Reference numerals 201 through 212 and reference numerals 217 through 219 are the same as in the configuration of FIG. 7, and disposed is third driving unit 220 which moves the irradiating unit in a direction of drawing a circular arc to an object to be processed.

In the light processing apparatus by this configuration, irradiation light by irradiating unit 210 is blocked by mounted components etc. on a substrate, and even in case that it is not possible to carry out irradiation with vicinity of the second light path on the substrate, it becomes possible to change an irradiating direction to an arbitrary direction by third driving unit 220. Therefore, it is possible to carry out irradiation with the vicinity of the second light path on the substrate, without being blocked by mounted components.

By this means, the second driving unit is controlled by the driving unit on the basis of a substrate warp age amount which was measured by the measuring unit, to move the processing head in a direction of substrate warp age, and thereby, it is possible to carry out high quality soldering processing without bring about a change of an irradiation diameter and deviance of a string solder feeding position at the time of light beam processing, regardless of a state of a mounted component on the substrate.

Embodiment 10

A tenth embodiment of the invention will be described by use of FIG. 9.

Figure 9:
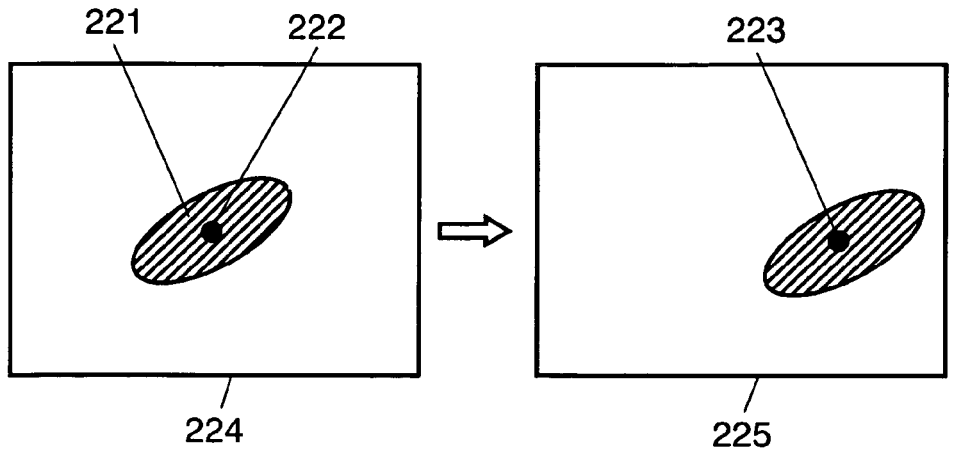
FIG. 9 is a screen view of an irradiation state in a tenth embodiment of the invention.

FIG. 9 is a view which showed a change of an image receiving state of reflected light, and reference numeral 221 shows a shape of irradiation reflected lights. Reference numerals 224 and 225 show an irradiation state image at the time of teaching, and an irradiation state image at the time of processing, respectively. There is such a case that an irradiation state becomes an obscure image state which was distorted from a perfect circle, as shown with reference numerals 224 and 225, due to a focusing characteristic and a mounting position of the irradiating unit, and also, a surface state and a color of the substrate which is a point to be irradiated, a wiring pattern, a land shape and so on.

In the such like case, in order to quantitatively calculate a change of a light shape at the time of irradiation, between the time of teaching and the time of actually processing, measurement is carried out with high accuracy, by taking gravity point positions 222 and 223 of the light shape. Storing a value of light shape gravity point position 222 at the time of teaching, it is possible to carry out measurement, for example, in a drive control device, by use of a difference with a value of light shape gravity point position 223 at the time of processing as a substrate warp age amount. By this means, it is possible to measure a substrate warp age state with high accuracy, regardless of a focusing characteristic and a mounting position of the irradiating unit, and also, a surface state and a color of the substrate which is a point to be irradiated, a wiring pattern, a land shape and so on.

Embodiment 11

Figure 10:
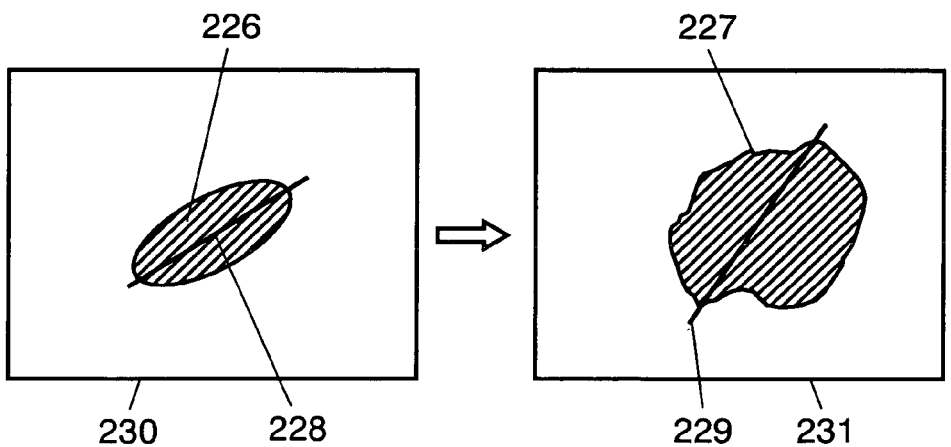
FIG. 10 is a screen view of an irradiation state in an eleventh embodiment of the invention.

An eleventh embodiment of the invention will be described by use of FIG. 10. FIG. 10 is a view which showed a change of an image receiving state of reflected light. Reference numeral 230 shows an irradiation state screen at the time of teaching, and reference numeral 231 shows an irradiation state screen at the time of processing. By a surface state and a color of the substrate which is a point to be irradiated, a wiring pattern, a land shape and so on, there is such a case that an irradiation state becomes a screen state of increasing obscurity in such a manner that light shape 227 at the time of processing is distorted largely, to light shape 226 at the time of teaching, as shown with reference numerals 226 and 227.

In the such like case, even if a position of a gravity point of a substrate is measured, there is such a possibility that an actual substrate warp age state can not be calculated with high accuracy, and therefore, it is detected, by taking a main axis angle of a light shape, that it came into the such like state. A value of light shape main axis angle 228 at the time of teaching is stored in a memory which is not shown in the figure, and a difference with a value of light shape main axis angle 229 at the time of processing is calculated, and if the difference falls within a predetermined scope, it can be judged as a substrate warp age amount measurable state, and in case that it exceeds the predetermined scope, it can be judged as a substrate warp age amount non-measurable state.

By this means, it is possible to judge a substrate warp age amount measuring state, regardless of a surface state and a color of the substrate which is a point to be irradiated, a wiring pattern, a land shape and so on, and it is possible to prevent processing bad item production before it happens, by realizing error stop at the time of non-measurable state. Meanwhile, the calculation as described above is also realized by a program which has been stored in advance, and execution of the program may be carried out by CPU of the light processing apparatus, by a separate computer, or in the drive control device.

Embodiment 12

Figure 11:
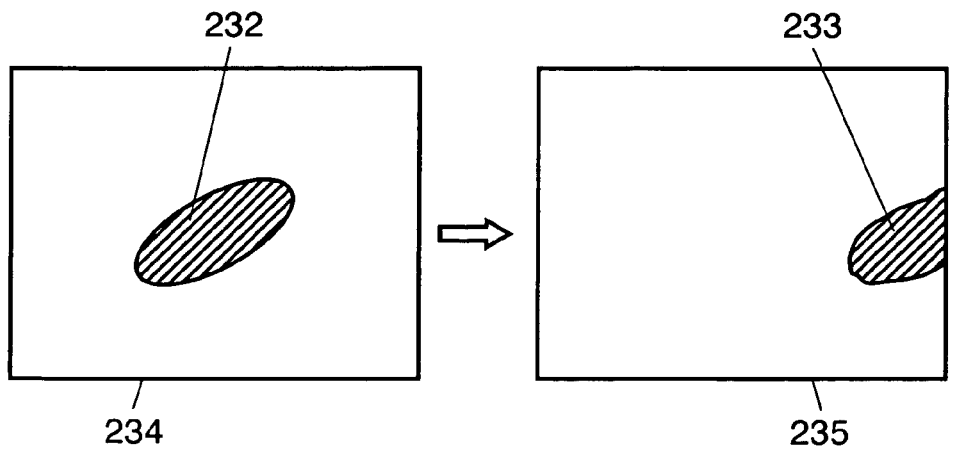
FIG. 11 is a screen view of an irradiation state in a twelfth embodiment of the invention.

A twelfth embodiment of the invention will be described by use of FIG. 11. FIG. 11 is a view which showed a change of an image receiving state of reflected light. Reference numeral 234 shows an irradiation state screen at the time of teaching, and reference numeral 235 shows an irradiation state screen at the time of processing. Due to various through-hole patterns of a substrate which is a point to be irradiated, there is such a fear that light by the irradiating unit penetrate through a through-hole due to a difference of mounting states at the time of teaching and at the time of processing, so that a light shape area of reflected light becomes small. In case that a warp age amount of a substrate is large, there is such a fear that a light shape at the time of processing becomes such a shape that it is cut on a screen, to a light shape at the time of teaching as shown with reference numerals 234 and 235. In the such like case, even if a position of a gravity point of the light shape is measured, there is such a possibility that it is not possible to calculate an actual substrate warp age state with high accuracy, and therefore, it is detected, by taking an area of the light shape, that it came into the such like state. A value of light shape area 232 at the time of teaching is stored, and a difference with a value of light shape area 233 at the time of processing is calculated, and if the difference falls within a predetermined scope, it can be judged as a substrate warp age amount measurable state, and in case that it exceeds the predetermined scope, it can be judged as a substrate warp age amount non-measurable state. By this means, it is possible to judge a substrate warp age amount measuring state, regardless of a through-hole pattern and an excessive substrate warp age state etc., and it is possible to prevent processing bad item production before it happens, by realizing error stop at the time of non-measurable state. The calculation as described above is realized by a program which has been stored in advance, and execution of the program may be carried out by CPU of the light processing apparatus, by a separate computer, or in the drive control device.

Embodiment 13

Figure 12:
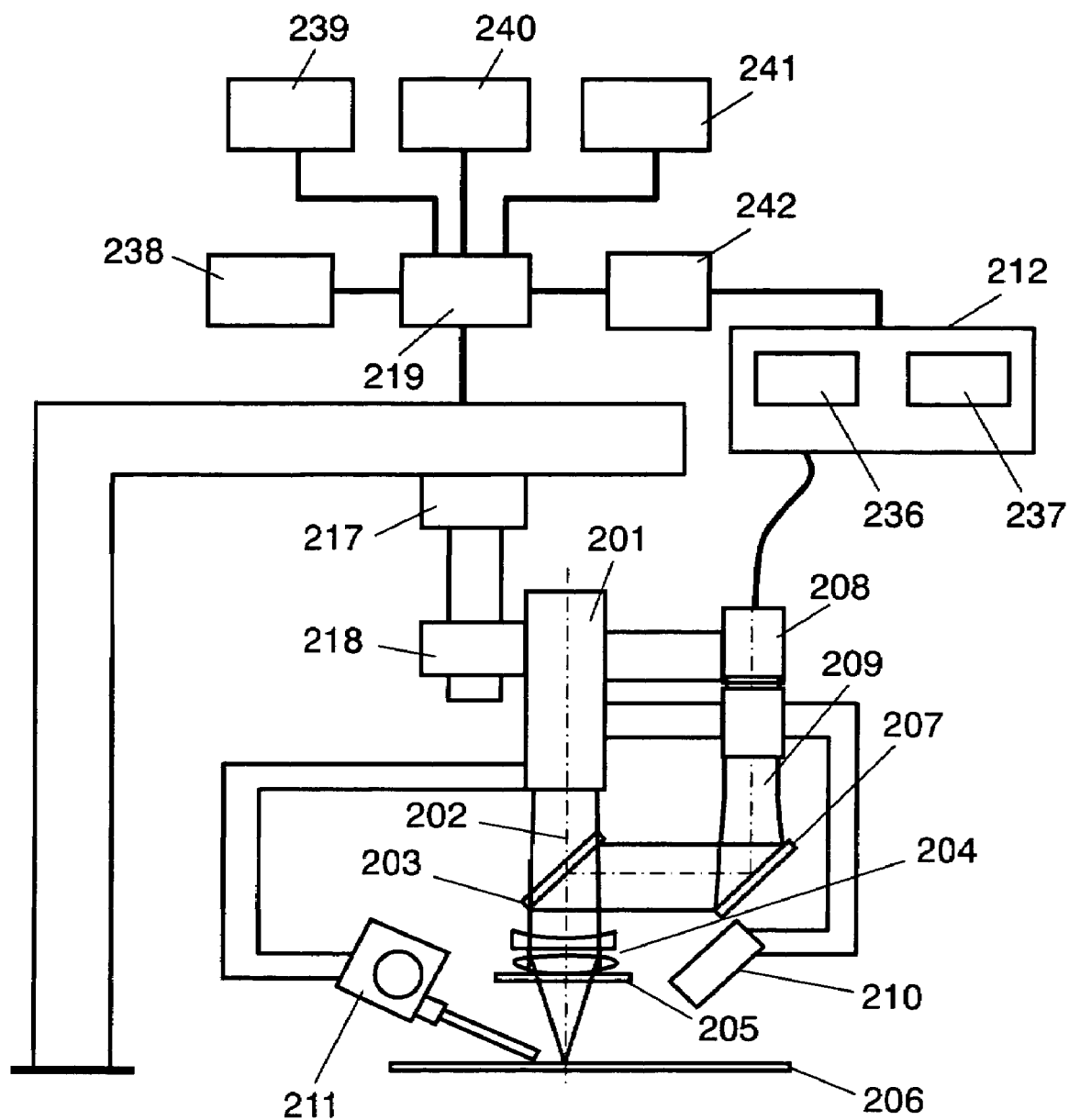
FIG. 12 is a schematic view of an apparatus configuration in a thirteenth embodiment of the invention.

A thirteenth embodiment of the invention will be described by use of FIG. 12. Reference numerals 201 through 212, and reference numerals 217 through 219 are the same as in the configuration of FIG. 7. Further, provided are first direction detection value judging unit 236 which judges a warp age amount detection state due to a substrate warp age direction, second direction detection value judging unit 237 which judges a warp age amount detection state due to deviance of a substrate in a horizontal direction, detection position storing unit 238 for storing a substrate warp age amount detection position, detection frequency setting unit 239 for setting up frequency of how much level of frequency of a detecting operation, warp age is detected with, in case of processing a substrate continuously, representative position determining unit 240 for setting up a representative position for judging a substrate warp age state among a plurality of measurement positions, permissible accuracy setting unit 241 for setting up a permissible value for judging a measurement state at the representative position, and detection data storing unit 242 for storing measurement data.

In the light processing apparatus by this configuration, permissible values of an area value etc. of a light shape which were measured by the measuring unit are registered at the time of teaching. In case that an area value, which was measured again at the time of actual processing, exceeds a predetermined scope, it is judged by the first direction detection value judging unit that measurement at the position is impossible, since a substrate is excessive, and the first driving unit, i.e., the processing head is made to go up and down with a predetermined amount in a substrate warp age direction, and measurements are carried out at respective positions. Even so, in case that it becomes non-measurable, to change a predetermined amount again is repeated with predetermined number of times. If measurement becomes possible at a moved position, such a thing that a measured amount at the position was added to a moving amount is to be a substrate warp age amount at that time. By this means, even in case that a one time measurable stroke is small, it becomes possible to carry out measurement an excessive substrate warp age state, by judging a measurement state and moving to a measurable position.

Next, in the same manner, permissible values of a main axis angle value etc. of a light shape, which were measured by the measuring unit, are registered at the time of teaching. In case that a main axis angle value, which was measured again at the time of actual processing, exceeds a predetermined scope, it is judged by the second direction detection value judging unit that measurement at the position is impossible, since a substrate surface state is very bad, and the second driving unit, i.e., the processing head in a horizontal direction to a substrate is moved with a predetermined amount in a predetermined direction, and measurements are carried out at respective positions. Even so, in case that it becomes non-measurable, to move in a predetermined direction with a predetermined amount again is repeated with predetermined number of times. If measurement becomes possible at a plurality of moved positions, a measured value which is close to a center value of the permissible scope among them is used as a substrate warp age amount at that time. By this means, even in case that a surface state of the substrate is very bad, a measurement state is judged to move to a measurable position, so that measurement in a substrate warp age state becomes possible.

Further, in this configuration, it is possible to divide a size of a substrate by a set value on a grid, and to register respective point as substrate warp age measurement positions through the use of the detection position storing unit, and therefore, it is possible to realize automatic registration of measurement positions in a lump sum. When measurement was carried out at this automatically registered measurement position, in case that it was judged by the above-described second direction detection value judging unit that it is impossible to measure, the second driving mean, i.e., the processing head in a horizontal direction to a substrate is moved with a predetermined amount in a predetermined direction, and to carry out measurement is repeated at respective positions, so that it is possible to automatically carry out correction of a measurement position.

Furthermore, in this configuration, there is the detection frequency setting unit for setting frequency of how much level of frequency of a detecting operation, warp age is detected with, in case of processing a substrate continuously. Therefore, substrate warp age measurement is not carried out each time at the time of continuous processing, but one time measurement is carried out with number of set times, and non-measurement time utilizes a previous measurement value which was stored in the detection data storing unit, so that it is possible to suppress tact time-up due to substrate warp age measurement time. As another tact time-up suppressing method, a representative position is selected by the representative position determining unit among a plurality of substrate warp age measurement positions on a substrate, and judgment of a measurement state at the representative position is carried out from a permissible value which was set up by the permissible accuracy setting unit, and in case that it exceeded the permissible value, substrate warp age measurement at a measurement position other than the representative position is carried out, and in case that it does not exceed, a previous measurement value, which was stored in the detection data storing unit, is utilized. By this means, it is possible to realize tact time shortening by carrying out re-measurement of a substrate warp age amount only in case of necessity.

Embodiment 14

Figure 13:
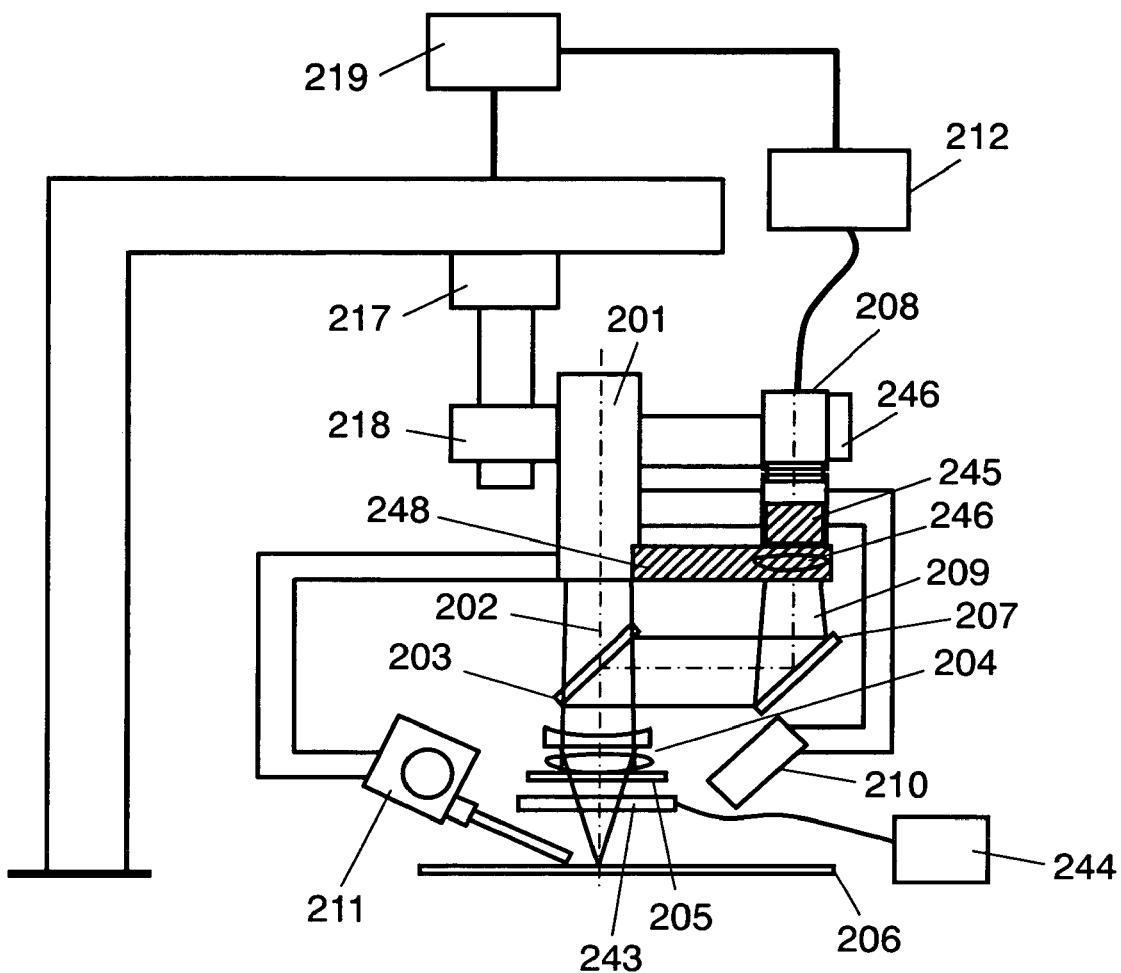
FIG. 13 is a schematic view of an apparatus configuration in a fourteenth embodiment of the invention.

A fourteenth embodiment of the invention will be described by use of FIG. 13. Reference numerals 201 through 212, and reference numerals 217 through 219 are the same as in the configuration of FIG. 7. Further, disposed are irradiating unit 243 which irradiates an object to be processed, illumination intensity controlling unit 244 which controls lighting illumination intensity, and in the image receiving unit, disposed is shutter function 245, shutter speed controlling unit 246 which controls shutter speed, and on the second light path, disposed are optical filter 247 which attenuates a specific wavelength band, and filter setup controlling unit 248 which controls an optical filter setup state.

In the light processing apparatus by this configuration, there is the illumination intensity controlling unit which controls illumination intensity of the irradiating unit which irradiates a substrate, in accordance with respective cases of the time of confirming a state of a substrate which is an object to be processed, the time of confirming a processing state, the time of confirming a light energy irradiation position on the substrate, and the time of confirming a light shape from the irradiating unit. Therefore, it is possible to select a lighting state which is optimum to respective statuses, and to confirm the state more clearly, and it becomes possible to carry out warp age amount measurement of the substrate with high accuracy.

Further, the shutter function is disposed in the image receiving unit, and there is the shutter speed controlling unit which controls shutter speed, in accordance with respective cases of the time of confirming a state of a substrate, the time of confirming a processing state, the time of confirming a light energy irradiation position on the substrate, and the time of confirming a light shape from the irradiating unit. Therefore, it is possible to select a shutter speed state which is optimum to respective statuses, and to confirm the state more clearly, and it becomes possible to carry out warp age amount measurement of the substrate with high accuracy.

Furthermore, since the optical filter for attenuating a specific wavelength band is disposed on the second light path, even in case that irradiation reflected light of light energy is strong, it is possible to reduce optical damage against the image receiving unit. On the occasion of confirming a processing state on an image receiving screen, visualization other than the reflected light becomes easy. This optical filer can be made to be effected only in case of necessity, by the filter setup controlling unit, and state confirmation becomes easy by setting it in an invalidated state at such time that a state of a normal substrate is confirmed.

Embodiment 15

Figure 14:
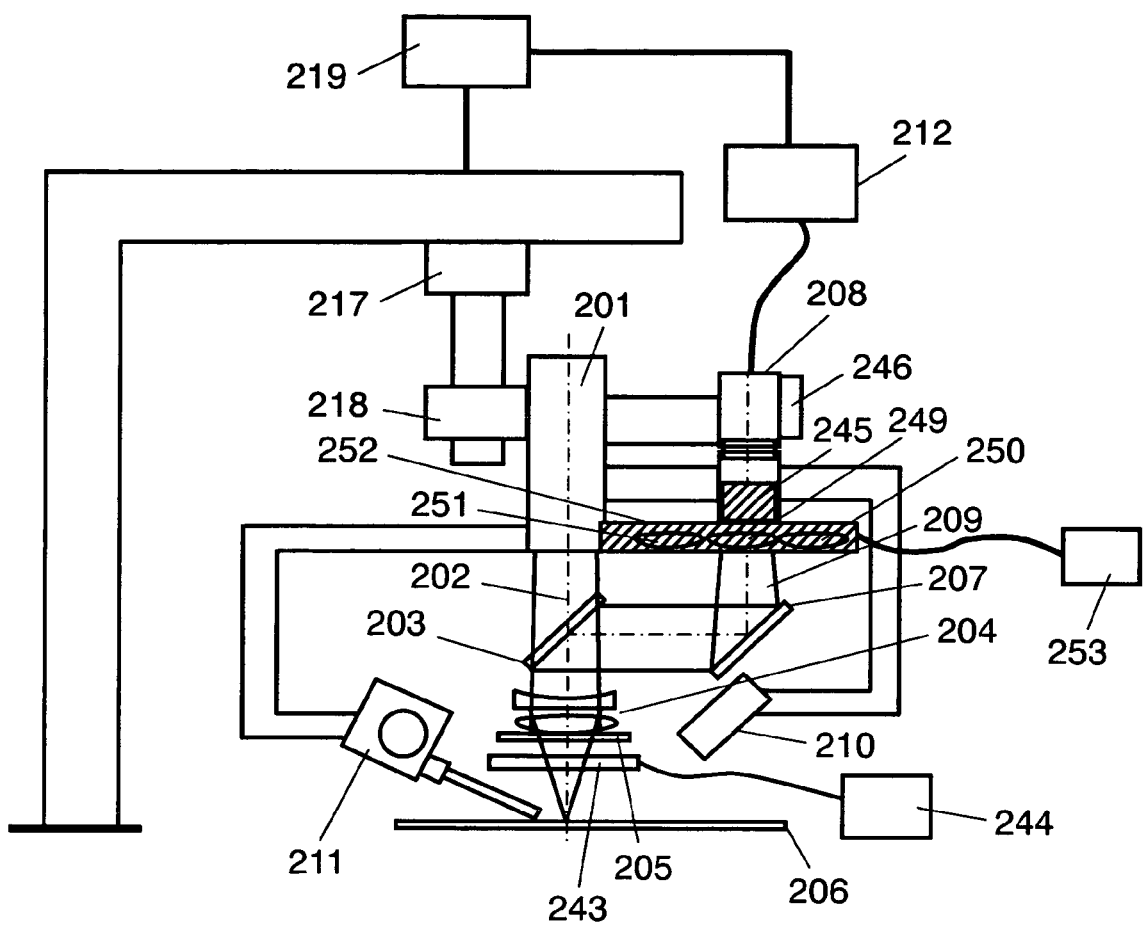
FIG. 14 is a schematic view of an apparatus configuration in a fifteenth embodiment of the invention.

A fifteenth embodiment of the invention will be described by use of FIG. 14. Reference numerals 201 through 212, reference numerals 217 through 219, and reference numerals 243 through 246 are the same as in the configuration of FIG. 13. Further, on the second light path, disposed are optical filters (1) 249, (2) 250, (3) 251 with different wavelength bands to be attenuated as an optical filter which attenuates a specific wavelength band, optical filter selection setting unit 252 which selects and sets up an optical filter to be used, and filter setup selection controlling unit 253 which selects and controls optical filter setup.

In the light processing apparatus by this configuration, it becomes possible to sequentially switch an optical filter which attenuates a specific wavelength band, in accordance with respective cases of the time of confirming a state of a substrate which is an object to be processed, the time of confirming a processing state, the time of confirming a light energy irradiation position on the substrate, and the time of confirming a light shape from the irradiating unit by means of filter setup selection controlling unit and optical filter selection setting unit. It is possible to select an optical filter which is optimum to respective statuses, and to confirm the state more clearly, and it becomes possible to carry out warp age amount measurement of the substrate with high accuracy.

Meanwhile, it is needless to say that the above-described apparatus configuration, unit, numerical value parameters, measurement methods and so on are simply one example.

An light processing apparatus of the invention can detects a warp age state and a warp age amount of an object to be processed, by irradiating an object to be processed, with irradiation light from an oblique direction without using a dedicated sensor, inputting its reflected light to the image receiving unit, and detecting its image shooting position. Therefore, the invention can realize light processing at an appropriate position in conformity with a state of a substrate at low cost, and can prevent production of a bad item before it happens, and enables local heating by focusing light energy, and is useful for a processing apparatus such as solder joint or heat processing of resin and a production equipment which used this.

What is claimed is:

1. An light processing apparatus for heat processing comprising:
    a light energy output unit which outputs light energy for heating an object to be processed;
    a first light path which guides the light energy to the object to be processed;
    a second light path which guides a light energy reflected from the object to be processed, the second light path partially overlapping with the first light path;
    an image receiving unit which is disposed in the second light path; and
    a comparing unit which compares an image from the image receiving unit and an image for comparison which has been set up in advance, and carries out goodness or badness judgment.

2. The light processing apparatus as set forth in claim 1, comprising:
    a first driving unit which relatively moves the first light path and the object to be processed in an approximately vertical direction to a direction of the light energy;
    a second driving unit which relatively moves the first light path and the object to be processed in an approximately horizontal direction to the direction of the light energy; and
    a drive controlling unit which controls the first driving unit and the second driving unit,
    wherein the image for comparison is set up with respect to each processing region of the object to be processed.

3. The light processing apparatus as set forth in claim 1, wherein in case that a color, which is used for carrying out the goodness or badness judgment, exists on a portion of the object to be processed before processing starts, the light processing apparatus skips the portion from processing.

4. The light processing apparatus as set forth in any of claims 1 through 3, wherein the comparing unit carries out goodness or badness judgment, before the object to be processed is irradiated with the light energy.

5. The light processing apparatus as set forth in any of claims 1 through 3, wherein the comparing unit carries out goodness or badness judgment, after the object to be processed was irradiated with the light energy.

6. The light processing apparatus as set forth in claim 1, further comprising:
an irradiating unit which irradiates light to vicinity of the second light path on the object to be processed from an oblique direction to the object to be processed; and
a detecting unit which receives a signal corresponding to a shape of the light from the irradiating unit on the object to be processed, and detects a position of the object to be processed to the first light path which is approximately in a horizontal direction against a direction of the light energy.

7. The light processing apparatus as set forth in claim 6, further comprising a light amount controlling unit which controls an amount of the light by the irradiating unit, depending on a state of the object to be processed.

8. The light processing apparatus as set forth in claim 6, further comprising:
a first driving unit which relatively moves the first light path and the object to be processed in an approximately vertical direction to a direction of the light energy;
a second driving unit which relatively moves the first light path and the object to be processed in an approximately horizontal direction to the direction of the light energy; and
a drive controlling unit which controls the first driving unit and the second driving unit,
wherein the signal from the detecting unit is inputted to the drive controlling unit and a position of the object to be processed is controlled to the first light path.

9. The light processing apparatus as set forth in claim 8, further comprising a third driving unit which moves the irradiating unit in a direction of drawing a circular arc to the object to be processed.

10. The light processing apparatus as set forth in any of claims 8 through 9, further comprising a first direction detection value judging unit,
wherein the first direction detection value judging unit relatively moves the first light path and the object to be processed in an approximately vertical direction to a direction of the light energy by the first driving unit, in case that the first direction detection value judging unit judged that it is not possible to carry out position detection within a scope which was set up in advance, and detects a position of the object to be processed, to the first light path in an approximately horizontal direction to a direction of the light energy, by at least one or more detecting operation.

11. The light processing apparatus as set forth in any of claims 10, further comprising a second direction detection value judging unit,
wherein the first light path and the object to be processed are relatively moved in an approximately horizontal direction to a direction of light energy by the second driving unit, in case that the second direction detection value judging unit judged that it is not possible to carry out position detection within a scope which was set up in advance, and a position of the object to be processed to the first light path in an approximately horizontal direction to a direction of the light energy is detected by at least one detecting operation.

12. The light processing apparatus as set forth in any of claims 2 or 8, further comprising a second direction detection value judging unit,
wherein the first light path and the object to be processed are relatively moved in an approximately horizontal direction to a direction of light energy by the second driving unit, in case that the second direction detection value judging unit judged that it is not possible to carry out position detection within a scope which was set up in advance, and a position of the object to be processed to the first light path in an approximately horizontal direction to a direction of the light energy is detected by at least one detecting operation.

13. The light processing apparatus as set forth in any of claims 8 through 9, further comprising a detection position storing unit,
wherein a size of the object to be processed in an approximately vertical direction to a direction of the light energy is divided into a divided scope by a value which was set up in advance; and
wherein the detection position storing unit stores an arbitrary position within the divided scope as a position which is detected by the detecting unit, to move to the stored position by the first driving unit.

14. The light processing apparatus as set forth in any of claims 7 through 9, further comprising a detection data storing unit and a detection frequency setting unit,
wherein, in case of continuously carrying out at least one time detecting operation to a roughly identical object to be processed, to a plurality of objects to be processed, detection is carried out with frequency which was set up by the detection frequency setting unit, and in case that detection is not carried out, previous measurement data, which was stored in the detection data storing unit, is used.

15. The light processing apparatus as set forth in claim 14, further comprising:
a representative position setting unit; and
a permissible accuracy setting unit,
wherein, in case of continuously carrying out two or more times detecting operation to a roughly identical object to be processed, to a plurality of objects to be processed, detection is carried out at least one time, at a detection position which was set up by the representative position setting unit; and
wherein, in case that a result of the detection exceeds a scope which was set up by the permissible accuracy setting unit, a plurality of detecting operations are carried out, and in case that the result of the detection does not exceed, previous measurement data, which was stored by the detection data storing unit, is used.

16. The light processing apparatus as set forth in claim 15, further comprising:
an illuminating unit which illuminates the object to be processed, on the first light path; and
an illumination intensity controlling unit which controls illumination intensity of the illuminating unit in response to state confirmation of the object to be processed, processing state confirmation of the object to be processed, light energy irradiation position confirmation, and light shape confirmation from the irradiating unit.

17. The light processing apparatus as set forth in claim 15, wherein the image receiving unit has a shutter function, and
further comprising a shutter speed controlling unit which controls shutter speed in response to state confirmation of the object to be processed, processing state confirmation of the object to be processed, light energy irradiation position confirmation, and light shape confirmation from the irradiating unit.

18. The light processing apparatus as set forth in any of claims 15 through 17, further comprising an optical filter which attenuates a specific wavelength band on the second light path.

19. The light processing apparatus as set forth in any of claims 15 through 17, further comprising:
   an optical filter setting unit which is configured to arbitrarily set up an optical filter which attenuates a specific wavelength band on the second light path; and
   a filter setup controlling unit which controls optical filter setup in response to state confirmation of the object to be processed, processing state confirmation of the object to be processed, light energy irradiation position confirmation, and light shape confirmation from the irradiating unit.

20. The light processing apparatus as set forth in claim 8, further comprising:
   a light amount controlling unit which controls an amount of the light by the irradiating unit, depending on a state of the object to be processed, and
   a first direction detection value judging unit,
   wherein the first direction detection value judging unit relatively moves the first light path and the object to be processed in an approximately vertical direction to a direction of the light energy by the first driving unit, in case that the first direction detection value judging unit judged that it is not possible to carry out position detection within a scope which was set up in advance, and detects a position of the object to be processed, to the first light path in an approximately horizontal direction to a direction of the light energy, by at least one or more detecting operation.

21. The light processing apparatus as set forth in claim 8, further comprising:
   a light amount controlling unit which controls an amount of the light by the irradiating unit, depending on a state of the object to be processed, and
   a second direction detection value judging unit,
   wherein the first light path and the object to be processed are relatively moved in an approximately horizontal direction to a direction of light energy by the second driving unit, in case that the second direction detection value judging unit judged that it is not possible to carry out position detection within a scope which was set up in advance, and a position of the object to be processed to the first light path in an approximately horizontal direction to a direction of the light energy is detected by at least one detecting operation.

22. The light processing apparatus as set forth in claim 8, further comprising:
   a light amount controlling unit which controls an amount of the light by the irradiating unit, depending on a state of the object to be processed, and
   a detection position storing unit,
   wherein a size of the object to be processed in an approximately vertical direction to a direction of the light energy is divided into a divided scope by a value which was set up in advance, and
   wherein the detection position storing unit stores an arbitrary position within the divided scope as a position which is detected by the detecting unit, to move to the stored position by the first driving unit.

23. The light processing apparatus as set forth in any of claims 6 through 9, wherein the detecting unit detects a gravity point position of a shape of the light from the irradiating unit on the object to be processed, and detects a position of the object to be processed, to the first light path in an approximately horizontal direction to a direction of the light energy, from deviance of a setup value which was set up in advance and the detected gravity point position.

24. The light processing apparatus as set forth in any of claims 6 through 9, wherein the detecting unit detects an angle of a main axis which shows a maximum length of a shape of the light from the irradiating unit on the object to be processed, and detects a detection state of a position of the object to be processed, to the first light path in an approximately horizontal direction to a direction of the light energy, from deviance of a setup value which was set up in advance and the detected angle of the main axis.

25. The light processing apparatus as set forth in any of claims 6 through 9, wherein the detecting unit detects an area of a shape of the light from the irradiating unit on the object to be processed, and detects a detection state of the object to be processed, to the first light path in an approximately horizontal direction to a direction of the light energy, from a difference of a setup value which was set up in advance and the detected area.

* * * * *